United States Patent [19]

Marmer

[11] 4,114,294
[45] Sep. 19, 1978

[54] ARITHMETIC TEACHING DEVICE

[76] Inventor: Melvin Marmer, 10531 NW. 24th Ct., Sunrise, Fla. 33322

[21] Appl. No.: 565,669

[22] Filed: Apr. 7, 1975

[51] Int. Cl.² .......................... G09B 9/00; G09B 19/02
[52] U.S. Cl. ...................................... 35/31 C; 35/9 R
[58] Field of Search .................... 35/31 C, 31 R, 9 R, 35/9 A, 9 B

[56] References Cited

U.S. PATENT DOCUMENTS

| | | | |
|---|---|---|---|
| 2,921,385 | 1/1960 | Hamilton | 35/9 R |
| 3,121,959 | 2/1964 | Uttal | 39/9 R |
| 3,584,398 | 6/1971 | Meyer et al. | 35/31 C |
| 3,787,988 | 1/1974 | Nakajima et al. | 35/31 R |
| 3,854,226 | 12/1974 | Divine et al. | 35/31 C |

*Primary Examiner*—William H. Grieb
*Attorney, Agent, or Firm*—Malin & Haley

[57] ABSTRACT

An arithmetic teaching device which includes a calculator for performing arithmetic problems, such as addition, subtraction, multiplication and division, a display means having a first display portion and a second display portion with the second display portion which provides indicia of the answer having a delay means connected thereto such that from the keyboard the student may provide a visual display of the numerals and the operatives, such as a plus or minus symbol, on a display face and mentally provide an answer to the problem before a second display portion displays the answer. The timing for display of the answer itself is adjustable to provide a variable delay time. The device allows the student sufficient time to mentally form an answer which then when subsequently displayed can be compared with the proper answer provided by the device.

1 Claim, 2 Drawing Figures

ARITHMETIC TEACHING DEVICE

BACKGROUND OF THE INVENTION

This invention relates generally to arithmetic teaching devices and specifically to an improved arithmetic teaching device which provides a display panel useful in motivating a student to learn the proper answers to arithmetic problems encountered with addition, subtraction, multiplication or division. The display itself which is actuated by a keyboard displays the numerals of the problem in addition to the operative or type of problem being solved. The correct answer will be provided on the display after a predetermined time delay to allow the student time to mentally form an answer before having the benefit of the displayed correct answer.

In the prior art there are disclosed many teaching devices of an electro-mechanical nature which have a plethora of display features allowing the student to match the correct answer to his own selected answer. The instant invention introduces a time factor into the teaching process which creates a competitive learning, testing situation, reducing the answer response time available to the student which might otherwise allow him to use other means such as counting on his fingers to reach the answer. The time competition stimulates and motivates the memorization of the proper answer from immediate recall or reinforcement when the proper answer is then shown on the display. If the student recalls the correct answer before it is displayed, he then achieves the satisfaction of knowing that he "beat the machine". Variable time settings for withholding the answer display have been provided to accommodate students at various levels of mathematical competence.

BRIEF DESCRIPTION OF THE INVENTION

A teaching device including a keyboard actuated calculator, said calculator having a visual indicia display which is coupled to the keyboard and to the answer from the calculator such that both the numerals used in a mathematical problem of either addition, subtraction, multiplication or division, will be displayed on the first portion of the display with a second portion of the display having a time delay mechanism which prevents the answer from being received until after the specific time delay has elapsed. The time delay is acheived with a variable delay means adjustable on the console face to provide a variation in the answer display time. The time delay variation can be adjusted from three to eight seconds depending upon the competence level of the student. The calculator portion which solves the mathematical problem is conventional and may be constructed with micro-electrical circuits so that the device can be hand-held and pocket sized. A timing delay circuit is added to the calculator output which drives the answer display which dos not require an extreme amount of additional circuitry to vary the size of the calculator. This will allow each child to have his own device and to get more utilization than if the device were so large it would have to be centrally located and were not portable. Thus the child may use the calculator both as a toy but with constructive results in learning and memorizing the various addition, subtraction, multiplication and division tables in a challenging way. The keyboard will also include a button for clearing the display face, an erase button if the wrong number were put in, an on-off switch, and a standard keyboard with numerals zero through nine and the symbol for providing the operative of addition, subtraction, multiplication and division, with the symbol being provided also on the display face.

In operation, the student would press the particular numerals and the proper operative to define the problem on the display portion. He would then press the equal sign or the device operator which triggers the calculating portion to provide an answer but with the time delay circuit the correct answer display is delayed for a particular number of seconds which are predetermined by the position of the time delay switch.

It is an object of this invention to provide an improved teaching aid or teaching device for use in learning arithmetic numeral tables.

It is another object of this invention to provide a hand-held pocket sized teaching device which motivates and challenges student or child to compete with the device as a function of time in arriving at the correct answer.

But still another object of this invention is to provide a toy-like calculator for use as a teaching aid to aid a child in learning and mastering arithmetic calculations.

And yet still another object of this invention is to provide an arithmetic calculator having a time delay in the answer display which is useful as a teaching device for children, youngsters and the like.

In accordance with these and other objects which will be apparent hereinafter, the instant invention will now be described with particular reference to the accompanying drawings.

PREFERRED EMBODIMENT OF THE INVENTION

Figure 1:
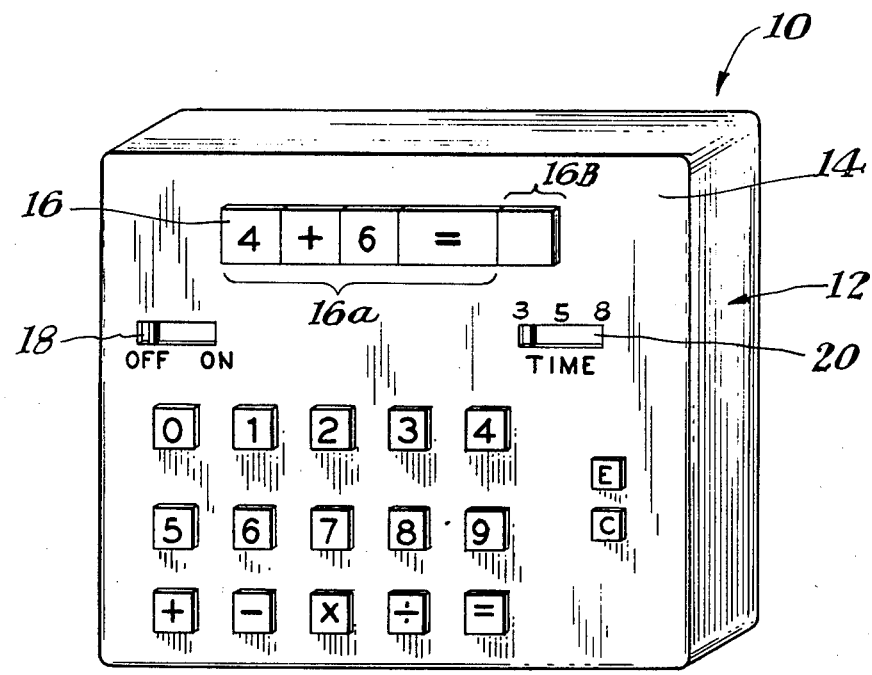
FIG. 1 shows a perspective view of the instant invention including the display panel and the keyboard.

Referring now to the drawings and especially FIG. 1, the instant invention is shown generally at 10 comprised of a rectangular shaped housing 12 having a front display panel 14 with the electrical calculating components being disposed within housing 12 but not shown in this figure. The electronic calculator portion is conventional in terms of its operation with the variations described below. The front panel 14 includes a display portion 16 which provides for a visual display of the numerals, the operatives such as addition, subtraction, multiplication and division symbols, a place for an equal sign and a portion for the answer which is shown as 16B. Display portion 16A includes the numerals of the problem, the operator and the equal sign. The device includes an on-off switch 18 which turns the power of the device on. A display light may be included to show the child or student that the device is in an operative condition. A plurality of keys are provided which are labeled from zero through nine which represent the particular numeral to be utilized in the equation. The keyboard operates in a conventional manner. An erase button is provided labeled "E" which erases the last input with a clear button provided which clears the entire problem from the display face. At the bottom of the keyboard is shown the operative keys which have symbols accordingly to provide the particular steps of addition, subtraction, multiplication and division. The equal sign provided is the actuating key of the device which drives the calculator to solve the problem. A dial labeled "time" which provides the time delay is shown with a delay between three seconds and eight seconds which adds the necessary display delay time on the answer being received within portion 16B of the display panel once the equal sign has been depressed in order to have the machine provide the proper and correct answer to the problem. The device may be battery powered or may be adapted to plug into conventional outlet as a power source.

Figure 2:
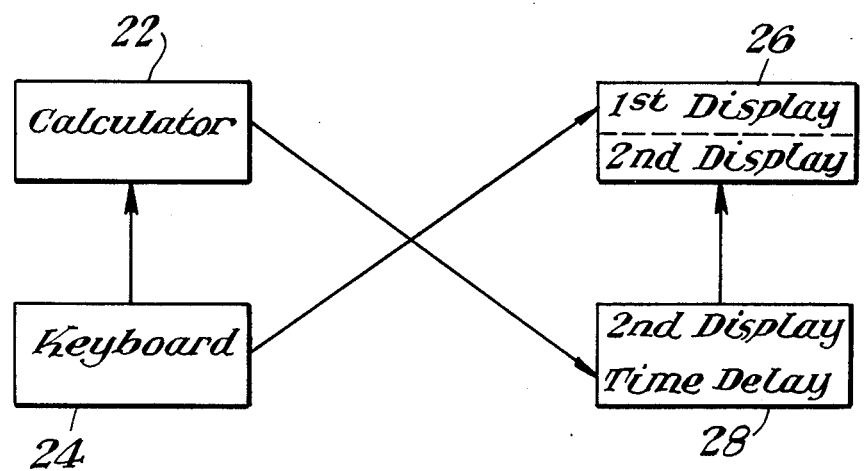
FIG. 2 is a schematic diagram of the operation of the instant invention.

FIG. 2 shows the operation of the device with the calculator 22 being the mechanical and electrical portion of the device that solves the arithmetical problems which are inputed from the keyboard 24. From the calculator, the answer is then transmitted through the second display portion time delay 28 which delays the display on the second display of the answer itself. The keybord is connected into the first display portion without a time delay such that the numerals and the operative may be displayed when the student depresses the respective keyboard button to initiate the problem.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A teaching device for teaching the solution to arithmetic problems comprising:

an electronic arithmetic calculating means;

a keyboard having a plurality of numerical keys and operatives connected to said arithmetic calculating means for formulating arithmetical problems;

a numerical indicia display panel having a first display portion and a second display portion, said first display portion being connected to and actuated by said keyboard for displaying particular numerals and the operative of a particular arithmetic problem, said second display portion disposed adjacent said first display portion;

means for actuating said arithmetic calculating means for solving arithmetic problems coupled to said keyboard; and an adjustable, numerical indicia time delay circuit connected between said arithmetic calculating means and said second display portion for delaying the display of the second display portion representative of an answer received from the arithmetic calculating means.

* * * * *